United States Patent
Sinnl

[19]

[11] Patent Number: 6,126,418
[45] Date of Patent: Oct. 3, 2000

[54] PISTON PUMP

[75] Inventor: Erwin Sinnl, Meimsheim, Germany

[73] Assignee: Robert Bosch GmbH, Stuttgart, Germany

[21] Appl. No.: 09/166,068

[22] Filed: Oct. 5, 1998

[30] Foreign Application Priority Data

Oct. 29, 1997 [DE] Germany ............................ 197 47 672

[51] Int. Cl.⁷ .............................. F04B 19/00; F04B 37/00
[52] U.S. Cl. ........................................... 417/470; 417/273
[58] Field of Search .............................. 305/10; 251/63.6;
222/321; 239/91; 417/415, 326, 273, 470,
503, 552, 554, 500; 91/447; 184/24

[56] References Cited

U.S. PATENT DOCUMENTS

| | | | |
|---|---|---|---|
| 3,593,959 | 7/1971 | Greene | 251/63.6 |
| 4,231,493 | 11/1980 | Kutik et al. | 222/321 |
| 4,402,432 | 9/1983 | Corsette | 222/321 |
| 4,457,564 | 7/1984 | Ruge et al. | 305/10 |
| 4,807,811 | 2/1989 | Aketa et al. | 231/91 |
| 4,915,602 | 4/1990 | Tschopp | 417/503 |
| 4,958,553 | 9/1990 | Ueno | 91/447 |
| 5,346,037 | 9/1994 | Flaig et al. | 184/24 |
| 5,382,140 | 1/1995 | Eisenbacher et al. | 417/273 |
| 5,472,320 | 12/1995 | Weisbrodt | 417/326 |

FOREIGN PATENT DOCUMENTS

| | | |
|---|---|---|
| 26 13 577 | 10/1977 | Germany . |
| 2020251 | 9/1994 | Russian Federation . |
| 2 163 222 | 2/1986 | United Kingdom . |
| 2 231 097 | 11/1990 | United Kingdom . |
| 2 306 580 | 5/1997 | United Kingdom . |

*Primary Examiner*—Teresa Walberg
*Assistant Examiner*—Leonid Fastovsky
*Attorney, Agent, or Firm*—Ronald E. Greigg; Edwin E. Greigg

[57] ABSTRACT

The invention relates to a piston pump with a piston that is axially displaceable in a pump bore of a pump housing. To enable making the piston pump with a short structure, the piston is embodied with a tubular guide portion, which on its inside is guided axially displaceably on a guide element solidly connected to the housing and protrudes into the guide portion. In this way, an inlet and outlet valve can be integrated with the piston and with the guide element protruding into the guide portion of the piston, as a result of which the piston pump can be embodied with only a slightly greater structural length than the length of the piston. A further advantage is that a piston restoring spring can be disposed outside the positive displacement chamber, so that an idle volume of the positive displacement chamber at the end of a supply stroke of the piston can be reduced to virtually zero, which improves the efficiency of the piston pump

9 Claims, 1 Drawing Sheet

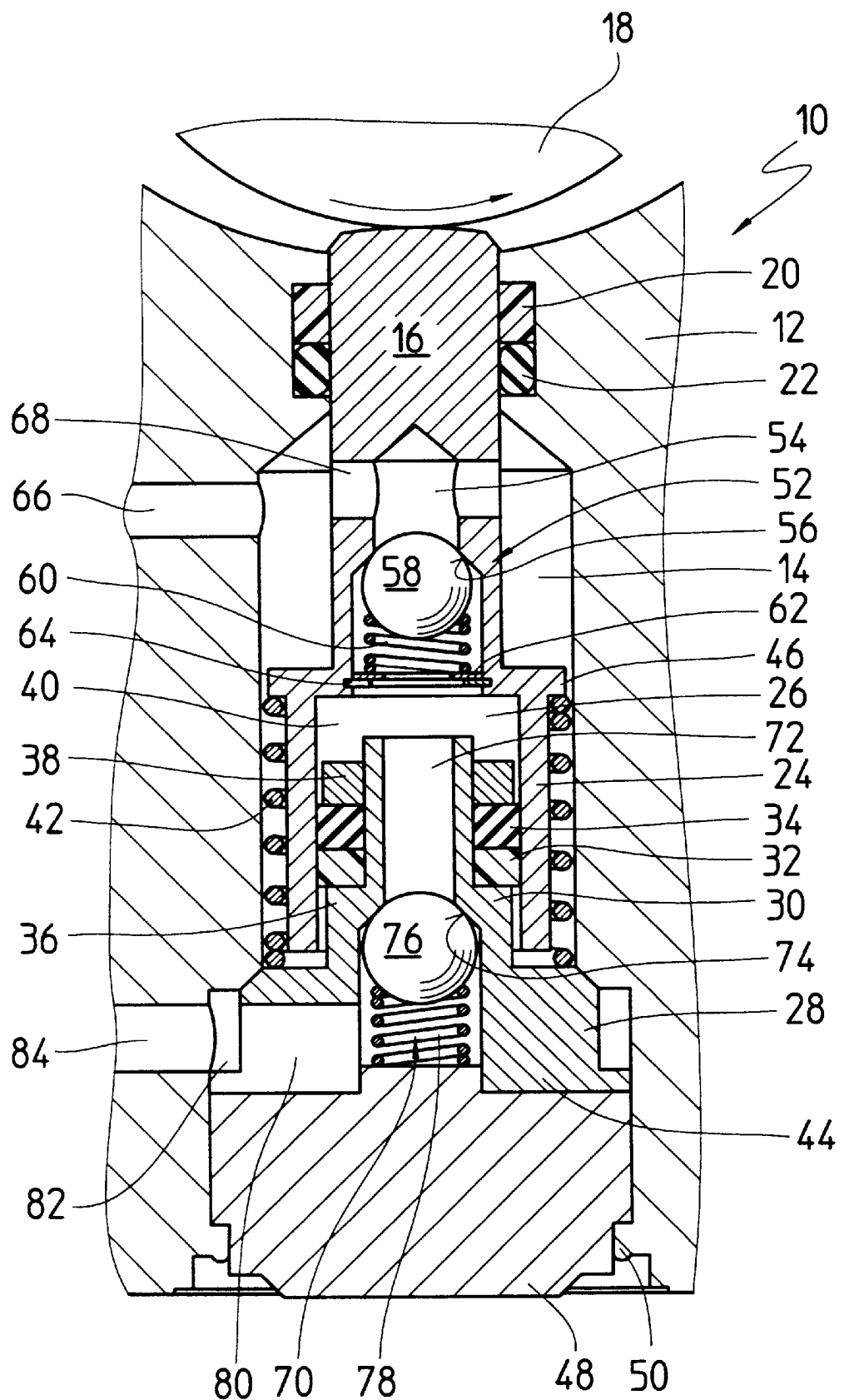

PISTON PUMP

BACKGROUND OF THE INVENTION

The invention relates to a piston pump which is intended in particular for use in a hydraulic brake system of a vehicle.

Such piston pumps are known per se; see for instance German Patent Disclosure DE 41 07 979 A1. The known piston pump has a piston, which is axially displaceable in a pump housing and can be driven to an axial reciprocating stroke motion. The piston is slidingly guided in the axial direction on the outer circumference.

OBJECT AND SUMMARY OF THE INVENTION

The piston of the piston pump according to the invention has an inner guide: The piston of the piston pump according to the invention is provided with a coaxial or at least axially parallel guide hole, with which it is axially displaceably guided on a guide element of for instance tanglike shape; the guide element is fixed in the pump housing and protrudes into the guide hole of the piston. The guide hole in the piston and the guide element of the pump housing preferably have a circular cross section, but like the piston they may also have a cross-sectional shape other than circular, for instance being oval, elliptical or polygonal in cross section. The piston pump of the invention has the advantage, first, that it can be inserted into a simply shaped and consequently easily produced housing bore. A liner for guiding the piston in the pump housing is unnecessary. Another advantage is a compact design of the piston pump of the invention, which makes a short structural length possible. A further advantage is that a piston restoring spring can be disposed outside a positive displacement chamber of the piston pump, the positive displacement chamber being formed by the guide hole, and as a result an idle volume, that is, a residual volume of the positive displacement chamber remaining at the end of a supply stroke of the piston, can be virtually zero. As a result, fluid aspirated by the piston pump into the positive displacement chamber upon an intake stroke of the piston is positively displaced virtually completely out of the positive displacement chamber upon the supply stroke, which improves the efficiency of the piston pump of the invention.

Accordingly, a check valve for controlling a flow through the piston pump is integrated with the piston, making it possible to shorten the structural length of the piston pump. A further shortening of the structural length of the piston pump can be attained by providing that a second check valve, controlling the flow direction through the piston pump, is integrated with the guide element, and the guide element protrudes into the guide hole of the piston. As a result of this feature of the invention, the second check valve can also be accommodated inside the piston, thus making a piston pump possible whose structural length is only slightly greater than the length of its piston.

The piston and the guide element of the piston pump of the invention can be embodied in such a way that they have no undercut or the like. This makes it possible to produce the piston and/or the guide element without metal cutting as reshaped parts, for instance by cold forming. This feature of the invention has the advantage of fast, economical production of the piston and/or guide element.

The piston pump of the invention is intended in particular as a pump in a brake system of a vehicle and is used to control the pressure in wheel brake cylinders. Depending on the type of brake system, the abbreviations ABS, ASR, FDR and EHB are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (ASR or FDR or EHB). In a brake system with wheel slip control (ABS or ASR) and/or a brake system serving as a steering aid (FDR) and/or an electrohydraulic brake system (EHB), the pump is needed. With the wheel slip control (ABS or ASR), locking of the wheels of the vehicle during a braking event involving strong pressure on the brake pedal (ABS) and/or spinning of the driven wheels of the vehicle in the event of strong pressure on the gas pedal (ASR) can for instance be prevented. In a brake system serving as a steering aid (FDR), a brake pressure is built up in one or more wheel brake cylinders independently of an actuation of the brake pedal or gas pedal, for instance to prevent the vehicle from braking out of the lane desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

The invention will be better understood and further objects and advantages thereof will become more apparent from the ensuing detailed description of a preferred embodiment taken in conjunction with the drawing.

BRIEF DESCRIPTION OF THE DRAWING

The sole FIGURE shows an axial section through a piston pump of the invention.

DESCRIPTION OF THE PREFERRED EMBODIMENT

The piston pump of the invention, identified overall by reference numeral 10, has a housing 12 with a continuous, stepped pump bore 14. The pump housing 12 is a hydraulic block of a slip-controlled hydraulic vehicle brake system, of which the drawing shows only a portion surrounding the pump 10. In addition to the piston pump 10, other hydraulic components such as magnet valves, hydraulic reservoirs and dampers are inserted into the hydraulic block and connected to one another hydraulically (not shown).

A piston 16 is axially displaceably received in the pump bore 14. One end of the piston 16, toward an eccentric element 18, is guided in the pump housing 12 by a guide ring 20 and sealed off in the pump housing 12 by a sealing ring 22. The guide ring 20 and sealing ring 22 are inserted together into an encompassing groove in the pump bore 14. On its end toward the eccentric element 18, the piston 16 is embodied as a solid cylinder.

On its end remote from the eccentric element 18, the piston 16 is tubular over a portion of its length, and the tubular portion forms a guide portion 24 of the piston 16. An interior of the guide portion 24 forms a guide hole 26 that is coaxial with the piston 16.

For axial guidance of the end of the piston 16 remote from the eccentric element 18, a rotationally symmetrical, stepped guide element 28 is inserted into the pump bore 14; it has a tanglike extension 30 that is integral with it and protrudes into the guide hole 26. A guide ring 32 and a sealing ring 34 are mounted onto the tanglike extension 30; they axially displaceably guide and seal off the piston 16 on the inside of its guide portion 24. Thus, the piston 16 has an internal guide on the inner circumference of its tubular guide portion 24, instead of the usual guide, in known piston pumps, on the outside of a jacket face of the piston.

The guide ring 32 and the sealing ring 34 rest on an annular shoulder 36 of the guide element 28 and are held immovably on the extension 30 by a retaining ring 38 pressed onto the tanglike extension 30 of the guide element 28.

The tubular guide portion 24 of the piston 16 encloses a positive displacement chamber 40 of the piston pump 10 according to the invention, which chamber is defined by the guide element 28 protruding into the guide portion 24. The disposition of the positive displacement chamber 40 inside the piston 16 is another deviation from known piston pumps, in which the positive displacement chamber is typically formed by a cylinder bore into which the piston is axially displaceably inserted, with one face end of the piston defining the positive displacement chamber.

To drive the piston to execute a reciprocating stroke motion in the axial direction in the pump bore 14, the eccentric element 18, which can be driven to rotate by an electric motor, only one face end of the piston 16 is used. A helical compression spring acting as the piston restoring spring 42 presses the piston 16 against a circumference of the eccentric element 18. The piston restoring spring 42 is slipped onto the outside of the tubular guide portion 24 of the piston 16, inside the pump bore 14. The piston restoring spring 42 is braced against a circular-disk-shaped base 44 of the guide element 28, which is integral with the guide element 28 and is located on the end of the piston 16 remote from the eccentric element 18; this base has a greater diameter than the tubular guide portion 24 of the piston 16. The base 44 is located axially outside the guide portion 24 of the piston 16. With its base 44, the guide element 28 is inserted coaxially, with a precise fit, into the pump bore 14. At the piston 16, the piston restoring spring 42 engages a radial collar 46 that protrudes outward past the piston circumference and that is formed at the transition from the tubular guide portion 24 to the solid-cylindrical portion of the piston 16. Since the piston restoring spring 42 is located outside the positive displacement chamber 40, the positive displacement chamber 40 is free of built-in fixtures, so that its volume can be reduced to virtually zero in a supply stroke of the piston pump 10. The guide portion 24 may have the same diameter as the remainder of the piston 16. In the exemplary embodiment shown, the guide portion 24 has a larger diameter than the solid-cylindrical remaining portion of the piston 16.

On its end remote from the eccentric element 18, the pump bore 14 is closed in pressure-tight fashion by a cylindrical closure stopper 48 inserted into it, which is fixed and sealed off by a caulking 50 of the pump housing 12. The closure stopper 48 fixes the guide element 28, which rests with its base 44 on the stopper 48, in the pump bore 14.

A spring-loaded check valve is integrated with the piston 16 and is formed in the exemplary embodiment shown by an inlet valve 52 of the piston pump 10 of the invention. The piston 16 is provided with an axial blind bore 54, which begins at a bottom of the guide hole 26 and has a conical annular shoulder that forms a valve seat 56 of the inlet valve 52. Inserted into the blind bore 54 is a valve ball 58, as a valve closing body, which is pressed against the valve seat 56 by a helical compression spring 60, acting as a valve closing spring. The valve closing spring 60 is braced against a perforated disk 62, which rests on a snap ring 64 that is inserted into a groove made in the blind bore 54 near a transition from the blind bore 54 into the guide hole 26. A fluid inflow to the piston pump 10 is effected through inlet bore 66, which is made radially to the pump bore 14, discharging into it, in the pump housing 12. From the inlet bore 66, the fluid flows into the pump bore 14 and through a transverse bore 68 in the piston 16, which intersects the blind bore 54, to the inlet valve 52.

A spring-loaded check valve is integrated with the guide element 28; in the exemplary embodiment shown, it forms an outlet valve 70 of the piston pump 10 of the invention. The guide element 28 has a continuous axial bore 72 with a conical annular shoulder that forms a valve seat 74 of the outlet valve 70. On an end remote from the eccentric element 18, the axial bore 72 is closed by the closure stopper 48, while the other end of the axial bore discharges openly into the positive displacement chamber 40. Inserted into the axial bore 72 is a valve ball 76, as a valve closing body, which is pressed against the valve seat 74 by a helical compression spring acting as a valve closing spring 78. The valve closing spring 78 is braced on the closure stopper 48. A fluid outflow from the piston pump 10 is effected through a radial groove 80, in the base 44 of the guide element 28, that is covered by the closure stopper 48 to a fluid opening. From the radial groove 80, the fluid flows via an annular conduit 82, surrounding the base 44, into an outlet bore 84 which is made in the pump housing 12 radially to the pump bore 14.

The embodiment of the fluid outlet as a groove 80 in the base 44 of the guide element 28 makes it possible to embody the guide element 28 without an undercut or the like. The guide element 28 can therefore be produced simply, quickly and economically without metal-cutting machining as a reshaped part, for instance by cold forming. Like the guide element 28, the piston 16 is also produced economically as a reshaped part.

The outlet valve 70 is accommodated substantially in the tanglike extension 30 of the guide element 28 that protrudes into the tubular guide portion 24 of the piston 16. That is, the outlet valve 70 is located substantially inside the piston 16. The piston pump 10 of the invention, with the inner guidance of its piston 16 in the guide portion 24, thus makes it possible to accommodate the inlet and outlet valves 52, 70 entirely or at least substantially within the piston 16. This makes it impossible to embody the piston pump 10 with a structural length that is hardly longer than the length of its piston 16. The piston pump 10 of the invention can therefore be embodied with a short structure.

The foregoing relates to a preferred exemplary embodiment of the invention, it being understood that other variants and embodiments thereof are possible within the spirit and scope of the invention, the latter being defined by the appended claims.

I claim:

1. A piston pump comprising a piston drivable to execute a reciprocating stroke motion, the piston being axially displaceably received in a pump bore (14) in a pump housing, the piston (16) has a coaxial or axially parallel guide hole (26), with which the piston (16) is axially displaceably guided on a guide element (28) inserted into the pump bore (14) of the pump housing (12), the guide element includes an extension (30) that protrudes into the guide hole (26) of the piston (16).

2. The piston pump according to claim 1, in which the piston (16) has a tubular guide portion (24) that forms the guide hole (26).

3. The piston pump according to claim 1, in which the piston pump (10) has a positive displacement chamber (40) bounded by the guide hole (26) and the guide element (28).

4. The piston pump according to claim 1, in which the piston pump (10) has a check valve (52), integrated with the piston (16), that is received in a hole (54) in an extension of the guide hole (26) in the piston (16).

5. The piston pump according to claim 1, in which the guide element (28) is embodied in tanglike fashion and includes an integrated check valve (70).

6. The piston pump according to claim 5, in which the guide element (28) has a groove (80), extending along its outer circumference, as a fluid opening.

7. The piston pump according to claim 3, in which the piston pump (10) has a piston restoring spring (42), which is braced against the pump housing (12) and presses the piston (16) against a circumference of a rotationally drivable eccentric element (18), and that the piston restoring spring (42) is disposed outside the positive displacement chamber (40), embracing the piston (16).

8. The piston pump according to claim 1, in which the piston (16) is a reshaped part.

9. The piston pump according to claim 1, in which the guide element (28) is a reshaped part.

* * * * *